US012342117B2

(12) United States Patent
Zhang

(10) Patent No.: US 12,342,117 B2
(45) Date of Patent: Jun. 24, 2025

(54) AUDIO DEVICE AND INTELLIGENT WEARABLE DEVICE

(71) Applicant: GOERTEK INC., Shandong (CN)

(72) Inventor: Jie Zhang, Shandong (CN)

(73) Assignee: GOERTEK INC., Weifang (CN)

( * ) Notice: Subject to any disclaimer, the term of this patent is extended or adjusted under 35 U.S.C. 154(b) by 208 days.

(21) Appl. No.: 18/263,239

(22) PCT Filed: Nov. 17, 2021

(86) PCT No.: PCT/CN2021/131119

§ 371 (c)(1),
(2) Date: Jul. 27, 2023

(87) PCT Pub. No.: WO2022/160874

PCT Pub. Date: Aug. 4, 2022

(65) Prior Publication Data

US 2024/0098394 A1 Mar. 21, 2024

(30) Foreign Application Priority Data

Jan. 27, 2021 (CN) ......................... 202110113761.8

(51) Int. Cl.
*H04R 1/02* (2006.01)
*H04S 1/00* (2006.01)

(52) U.S. Cl.
CPC ............. *H04R 1/025* (2013.01); *H04S 1/007* (2013.01); *H04R 2201/029* (2013.01);
(Continued)

(58) Field of Classification Search
CPC .............. H04R 1/025; H04R 2201/029; H04R 2400/01; H04R 2499/15; H04S 1/007; H04S 2400/01
See application file for complete search history.

(56) References Cited

U.S. PATENT DOCUMENTS

2018/0024588 A1* 1/2018 Han ...................... G06F 1/1605 381/333
2021/0127198 A1 4/2021 Deng et al.

FOREIGN PATENT DOCUMENTS

CN 201369811 Y 12/2009
CN 102257835 A 11/2011
(Continued)

OTHER PUBLICATIONS

Machine translation of CN 201369811; Jie Liu; Sound Cavity; Dec. 23, 2009 (Year: 2009).*
(Continued)

*Primary Examiner* — Andrew Sniezek
(74) *Attorney, Agent, or Firm* — Shih IP Law Group, PLLC

(57) ABSTRACT

Disclosed are an audio device and an intelligent wearable device. The audio device includes: a housing in which a first sound generation unit and a second sound generation unit are disposed, each of the first sound generation unit and the second sound generation unit has a front cavity and a rear cavity separated from each other, and the housing is provided with a first front sound hole in communication with the front cavity of the first sound generation unit, a second front sound hole in communication with the front cavity of the second sound generation unit, and a rear sound hole in communication with the rear cavity of the second sound generation unit. The audio device further includes a sliding baffle, wherein the sliding baffle is slidable between a first position and a second position with respect to the housing, and the sliding baffle is provided with a hole.

10 Claims, 3 Drawing Sheets

(52) U.S. Cl.
CPC ...... *H04R 2400/01* (2013.01); *H04R 2499/15* (2013.01); *H04S 2400/01* (2013.01)

(56) References Cited

FOREIGN PATENT DOCUMENTS

| | | | |
|---|---|---|---|
| CN | 202799030 | U | 3/2013 |
| CN | 109547588 | A | 3/2019 |
| CN | 111614823 | A | 9/2020 |
| CN | 111787456 | A | 10/2020 |
| CN | 112261180 | A | 1/2021 |
| CN | 112929769 | A | 6/2021 |
| WO | 2016039245 | A1 | 3/2016 |
| WO | 2018006552 | A1 | 1/2018 |

OTHER PUBLICATIONS

International Search Report from International Application No. PCT/CN2021/131119 mailed Jan. 27, 2022.

* cited by examiner

AUDIO DEVICE AND INTELLIGENT WEARABLE DEVICE

The present disclosure claims the priority of the Chinese Patent Application No. 202110113761.8, titled “AUDIO DEVICE AND INTELLIGENT WEARABLE DEVICE” filed in China Patent Office on Jan. 27, 2021, the entire contents of which are incorporated herein by reference.

TECHNICAL FIELD

The present disclosure relates to the technical field of acoustic device, and more particularly, to an audio device and an intelligent wearable device.

DESCRIPTION OF RELATED ART

With the improvement of living standards, people’s entertainment demands have become increasingly strong, and their love for electronic products has led to higher requirements on audio experience.

For example, with the rise of intelligent wearable products such as smart watches, smart bracelets, AR (Augmented Reality) devices, VR (Virtual Reality) devices, and neck-mounted speakers, and neck-mounted speakers, people have diverse demands for sound qualities. However, in contrast to the increasing scenarios of audio playback, there is only a few audio devices that can meet the requirements for various scenarios.

SUMMARY

In view of the problem that the existing audio device has a single audio playback effect and cannot meet the requirements of various scenarios, the present disclosure proposes an audio device and an intelligent wearable device to overcome the above problem.

In order to achieve the above object, the present disclosure proposes the following technical solutions.

In a first aspect, the present disclosure discloses an audio device, the audio device includes: a housing in which a first sound generation unit and a second sound generation unit are disposed, each of the first sound generation unit and the second sound generation unit has a front cavity and a rear cavity separated from each other, and the housing is provided with a first front sound hole in communication with the front cavity of the first sound generation unit, a second front sound hole in communication with the front cavity of the second sound generation unit, and a rear sound hole in communication with the rear cavity of the second sound generation unit.

The audio device further includes a sliding baffle, wherein the sliding baffle is slidable between a first position and a second position with respect to the housing, and the sliding baffle is provided with a first through hole and a second through hole.

When the sliding baffle is located at the first position, the first through hole is in communication with the second front sound hole so that the second front sound hole is opened, and the second through hole is misaligned with the rear sound hole so that the rear sound hole is closed, and wherein when the sliding baffle is located at the second position, the first through hole is misaligned with the second front sound hole so that the second front sound hole is closed, and the second through hole is in communication with the rear sound hole so that the rear sound hole is opened.

Optionally, the first sound generation unit and the second sound generation unit output signals having the same phase, and a distance between the first front sound hole and the second front sound hole is less than a distance between the first front sound hole and the rear sound hole.

Optionally, a partition plate is provided inside the housing, and the partition plate divides an inner cavity of the housing into two separated tube-shaped cavities to serve as the front cavities of the first sound generation unit and the second sound generation unit, respectively.

Optionally, the first sound generation unit and the second sound generation unit are respectively located at left and right sides of the partition plate, and the two tube-shaped cavities divided by the partition plate are arranged in an up and down direction in the housing. The first front sound hole and the second front sound hole are located in the middle of the housing and aligned in the up and down direction in the housing, and the rear sound hole is disposed at a side of the housing.

Optionally, the audio device further includes a driving unit, and the driving unit is configured to drive the sliding baffle to slide according to a control signal, so as to switch opening and closing states of the second front sound hole and the rear sound hole.

Optionally, the driving unit includes a driving motor and a gear which is engaged with the driving motor, a lever is provided on the gear, a sliding slot is provided on the sliding baffle, and the lever of the gear inserts into the sliding slot of the sliding baffle to drive the sliding baffle to slide by rotation of the driving motor.

Optionally, the audio device further includes a control unit configured to receive a switching instruction, and send a control signal to the driving unit according to the switching instruction.

Optionally, the control unit includes a microphone disposed in the housing, and the microphone receives the switching instruction through a microphone hole provided on the housing.

Optionally, the switching instruction is a predetermined tapping signal, the control unit further includes a signal processing circuit for processing signals received by the microphone, and generating a corresponding control signal if the predetermined tapping signal is detected.

Optionally, the microphone is also used as a voice microphone of the audio device.

In a second aspect, the present disclosure also discloses an intelligent wearable device, wherein the intelligent wearable device includes any audio device as described above.

In summary, embodiments according to the present disclosure have the following beneficial effects.

The audio device of the present disclosure has two sound generation units, each sound generation unit has a front cavity and a rear cavity separated from each other, the front cavity of the first sound generation unit has a first front sound hole, the front cavity of the second sound generation unit has a second front sound hole, and the rear cavity has a rear sound hole. According to the audio device of the present disclosure, a sliding baffle is used to change the sound generation combination of the front and rear cavities of the two sound generation units, so as to switch the effect of the loudspeaker of the audio device, thereby meeting the needs of sound effects in different scenes.

BRIEF DESCRIPTION OF DRAWINGS

In order to more clearly illustrate the embodiments of the present disclosure or the technical solutions in the prior art, the drawings required to be used for the content of the embodiments or the prior art will be briefly introduced in the following. Obviously, the drawings in the following description are merely a part of the drawings of the present disclosure, and for those of ordinary skill in the art, other drawings can also be obtained from the provided drawings without any creative effort.

Figure 1:
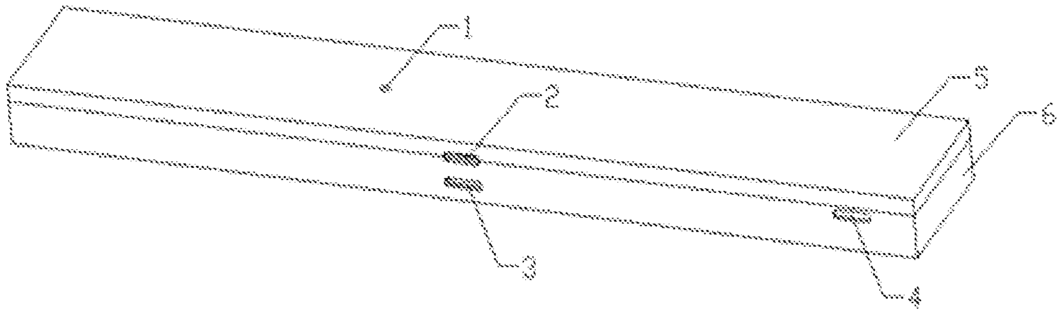
FIG. 1 is a schematic perspective view of an audio device provided by an embodiment of the present disclosure.

Reference signs in the drawings: 1: microphone hole; 2: first front sound hole; 3: second front sound hole; 4: rear sound hole; 5: upper housing; 6: lower housing; 7: first sound generation unit; 71: front cavity; 72: rear cavity; 8: second sound generation unit; 81: front cavity; 82: rear cavity; 9: sliding baffle; 91: first through hole; 92: second through hole; 10: partition plate; 11: driving motor; 12: gear; 13: circuit board.

DETAILED DESCRIPTIONS

In order to make the objects, technical solutions and advantages of the present disclosure clearer, the embodiments of the present disclosure will be further described in detail below in conjunction with the accompanying drawings.

In the description of the present disclosure, it should be noted that directivities or positional relationships indicated by terms such as "center", "up", "down", "left", "right", "vertical", "horizontal", "inner", "outer", etc. are directivities or positional relationships illustrated based on the drawings, and are only for the convenience of describing the present disclosure and simplifying the description, rather than indicating or implying that the referred device or element must have a specific directivity or be configured or operated in specific directivity, and thus cannot be construed as limiting the disclosure. In addition, "first", "second", "third", etc. are only for descriptive purposes, and should not be construed as indicating or implying their relative importance.

In the description of the present disclosure, it should be noted that unless otherwise expressly specified and limited, terms "connect", "communicate", "fix", etc. should be understood in a broad sense. For example, "fix" may refer to a fixed connection, a detachable connection, or may be integrated; may refer to a mechanical connection or an electrical connection; may be directly connected or indirectly connected through an intermediate medium; and it can be an internal communication between two elements. For those of ordinary skill in the art, the specific meanings of the above terms in the present disclosure can be understood according to specific situations.

According to the present disclosure, the audio device of the present disclosure has two sound generation units, each sound generation unit has a front cavity and a rear cavity separated from each other, the front cavity of the first sound generation unit has a first front sound hole, the front cavity of the second sound generation unit has a second front sound hole, and the rear cavity has a rear sound hole. According to the audio device of the present disclosure, a sliding baffle is used to change the sound generation combination of the front and rear cavities of the two sound generation units, so as to change the audio effect of the loudspeaker of the audio device, thereby meeting the needs of sound effects in different scenes.

FIGS. 1-5 show an exemplary embodiment of the audio device of the present disclosure.

As shown in FIG. 1, an audio device includes a housing including an upper housing 5 and a lower housing 6. A first sound generation unit 7 and a second sound generation unit 8 are disposed inside the housing, each of the first sound generation unit 7 and the second sound generation unit 8 has a front cavity and a rear cavity separated from each other. The housing is provided with a first front sound hole 2 in communication with the front cavity 71 of the first sound generation unit 7, a second front sound hole 3 in communication with the front cavity 81 of the second sound generation unit 8, and a rear sound hole 4 in communication with the rear cavity 83 of the second sound generation unit 8.

The audio device further includes a sliding baffle 9, the sliding baffle 9 may be slidable between a first position and a second position with respect to the housing, and a first through hole 91 and a second through hole 92 are provided on the sliding baffle. When the sliding baffle 9 is located at the first position, the first through hole 91 is in communication with the second front sound hole 3 so that the second front sound hole 3 is opened, and the second through hole 92 is misaligned with the rear sound hole 4 so that the rear sound hole 4 is closed. When the sliding baffle 9 is located at the second position, the first through hole 91 is misaligned with the second front sound hole 3 so that the second front sound hole 3 is closed, and the second through hole 92 is in communication with the rear sound hole 4 so that the rear sound hole 4 is opened.

Accordingly, in the present disclosure, the sound generation cavity of the second sound generation unit 8 among the two sound generation units is switchable, and by changing a sound generation cavity combination to produce sound, different phase combinations and sound generation position combinations between sound signals of the two sound generation units may be achieved, thereby forming different external sound effects and thus meeting the needs of sound effects in different scenes.

In the embodiment, the first sound generation unit 7 and the second sound generation unit 8 output signals having the same phase, and a distance between the first front sound hole 2 and the second front sound hole 3 is less than a distance between the first front sound hole 2 and the rear sound hole 4. As such, when the first front sound hole 2 and the second front sound hole 3 generate sound at the same time, the two sound holes can be regarded as two monopoles having the same radiation phase, and a combined sound source is equivalent to an omnidirectional and amplitude doubled sound source, realizing an effect of near-field enhancement. When the first front sound hole 2 and the rear sound hole 4 generate sound at the same time, the two sound holes can be regarded as dipoles having the same radiation amplitude but opposite in phases, and a combined sound source has ∞-shaped directivity in the far field, realizing an effect of far-field directivity.

Figure 2:
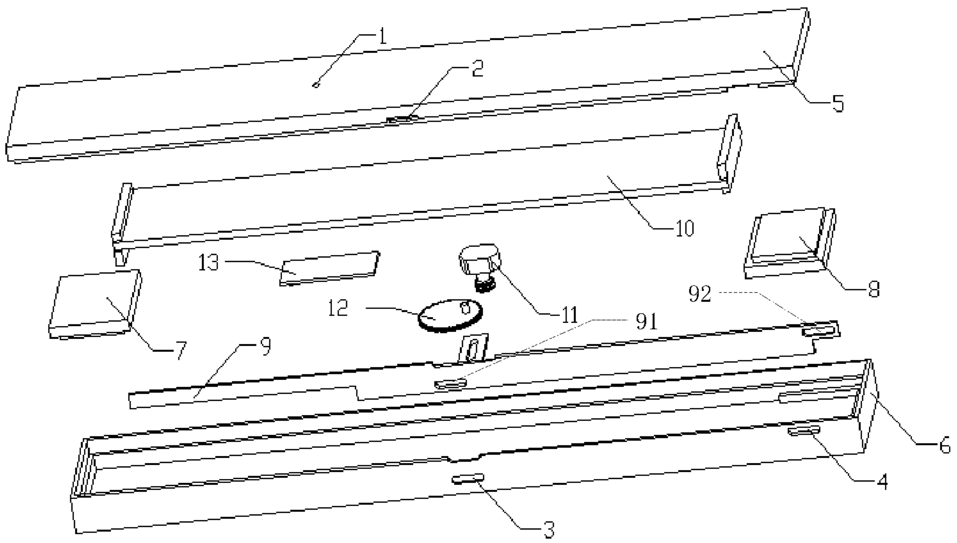
FIG. 2 is a schematic exploded view of the audio device provided by an embodiment of the present disclosure.
Figure 3:
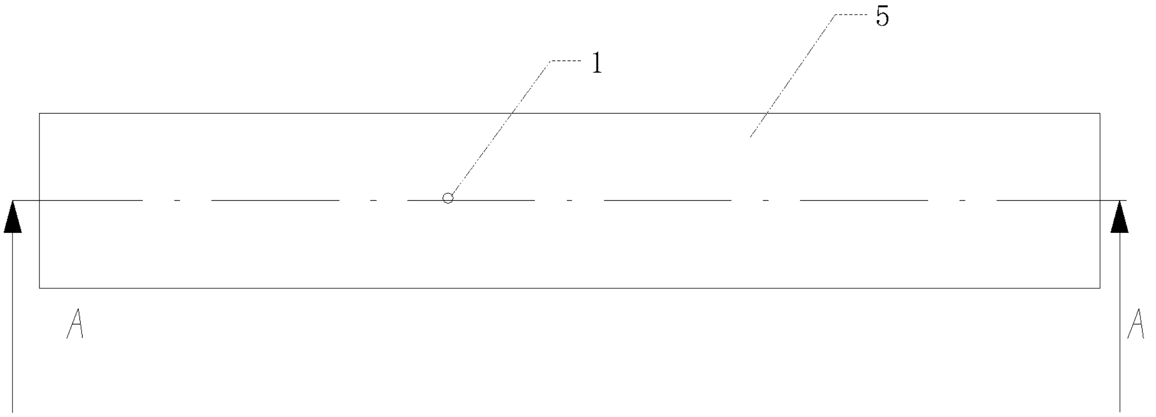
FIG. 3 is a schematic top view of the audio device provided by an embodiment of the present disclosure.
Figure 4:
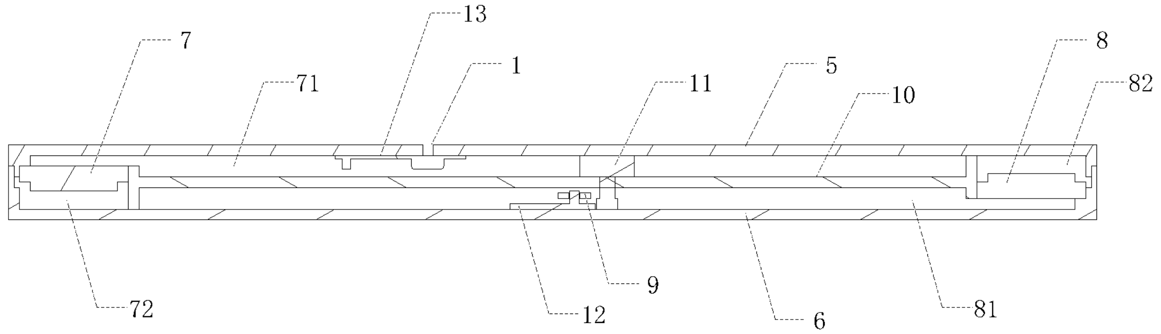
FIG. 4 is a schematic sectional view of plane A-A shown in FIG. 3.

In an embodiment of the present disclosure, as shown in FIGS. 2-4, a partition plate 10 is provided inside the housing, the partition plate 10 divides an inner cavity of the housing into two separated tube-shaped cavities to serve as the front cavities of the first sound generation unit 7 and the second sound generation unit 8, respectively. As shown in FIG. 4, the first sound generation unit 7 has a front cavity 71 and a rear cavity 72, and the second sound generation unit 8 has a front cavity 81 and a rear cavity 82. The two cavities are individual from each other, making sound effects of the respective cavities pure.

The first sound generation unit 7 and the second sound generation unit 8 are respectively located at left and right sides of the partition plate 10, the two tube-shaped cavities (i.e., the front cavity 71 and the front cavity 81) divided by the partition plate 10 are arranged in an up and down direction in the housing. In the embodiment, the second sound generation unit 8 is disposed at the right side in the audio device, so the rear sound hole 4 is also disposed at the right side in the housing. The first front sound hole 2 and the second front sound hole 3 are located in the middle of the housing and substantially aligned in an up and down direction in the housing, and the rear sound hole 4 is disposed at a side of the housing.

In an embodiment of the present disclosure, the audio device further includes a driving unit. The driving unit is configured to drive the sliding baffle 9 to move (i.e., to slide) according to a control signal, so as to switch opening and closing states of the second front sound hole 3 and the rear sound hole 4. That is, according to the embodiment of the present disclosure, the driving unit can be used to automatically realize the movement of the sliding baffle 9 without requiring the user to manually operates it.

Figure 5:
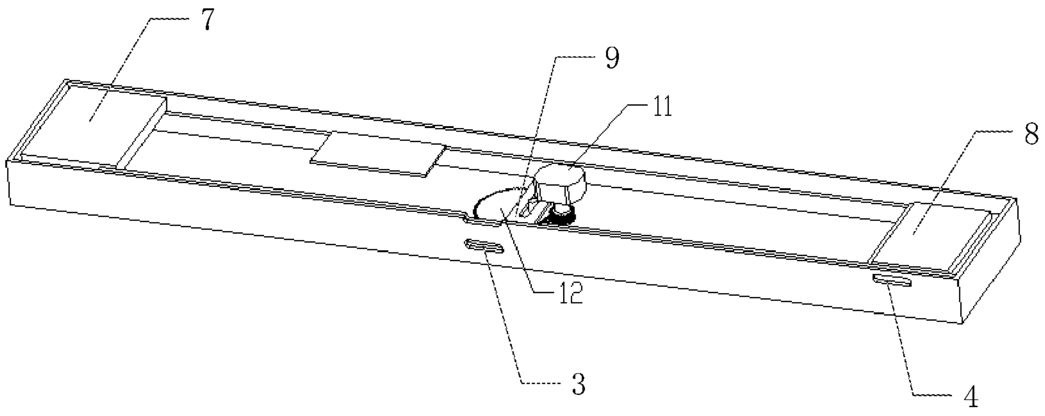
FIG. 5 is a schematic view of a driving unit of the audio device provided by an embodiment of the present disclosure.

In an embodiment of the present disclosure, as shown in FIGS. 2 and 5, the driving unit includes a driving motor 11 and a gear 12. The gear 12 is engaged with the driving motor 11, a lever is provided on the gear 12, a sliding slot is provided on the sliding baffle 9, and as shown in FIG. 5, the lever of the gear 12 inserts into the sliding slot of the sliding baffle 9 to drive the sliding baffle 9 to slide left and right by the rotation of the driving motor.

In an embodiment of the present disclosure, the audio device further includes a control unit, which is configured to receive a switching instruction, and send a control signal to the driving unit according to the switching instruction. The switching instruction may be the user's voice instruction, tapping instruction, button instruction, and wireless control instruction sent by other devices (for example, mobile phone, remote controller). The user only needs to give a predetermined switching instruction to control the sliding of the sliding baffle 9 of the audio device so as to switch to a desired external sound effect.

In an embodiment of the present disclosure, the control unit includes a microphone, the microphone is disposed in the housing, and the microphone receives the switching instruction through a microphone hole 1 provided on the housing. As shown in FIG. 2, the audio device according to the embodiment of the present disclosure is provided with a circuit board 13 on which a microphone is disposed, and the microphone is fixed at the microphone hole 1 through the circuit board 13 to realize signal collection. In the present disclosure, the microphone, instead of a contact sensor, is used to receive the switching instruction, which can avoid poor contact problems caused by wearing gloves or other insulation reasons. In addition, in a preferred embodiment of the present disclosure, the microphone may be the in-build voice microphone of the audio device, i.e., the microphone is the voice microphone of the audio device itself, which receives various voice commands and voice call data of the user. At the same time, the signal of the microphone is also used to extract the switching instruction to realize external sound effect switching function.

In an embodiment of the present disclosure, the switching instruction received by the microphone is a predetermined tapping signal. There are obvious differences between the tapping signal and the voice signal and friction noise signal in terms of energy and frequency, so that they can be easily distinguished from each other, so as to accurately implement the switching instruction. For example, to reduce the misjudgment rate of the switching instruction, a predetermined tapping instruction may be set as tapping 2 to 3 times continuously within a predetermined time, to realize the switching function. Meanwhile, the control unit may further include a signal processing circuit for processing signals received by the microphone, and generating a corresponding control signal after the predetermined tapping signal is detected. The signal processing circuit includes, for example, a digital signal processing chip DSP (Digital Signal Processing) and a microprocessor MCU (Microcontroller Unit). The digital signal processing chip DSP may quickly process a large number of audio signals to realize functions such as voice control and calling. When the digital signal processing chip DSP detects that the audio signal includes the predetermined tapping signal, it may send feedback information to the microprocessor MCU, so that the microprocessor MCU sends a control signal to the driving unit to drive the sliding baffle 9 to move, so as to change the external audio playback effect.

Figure 6:
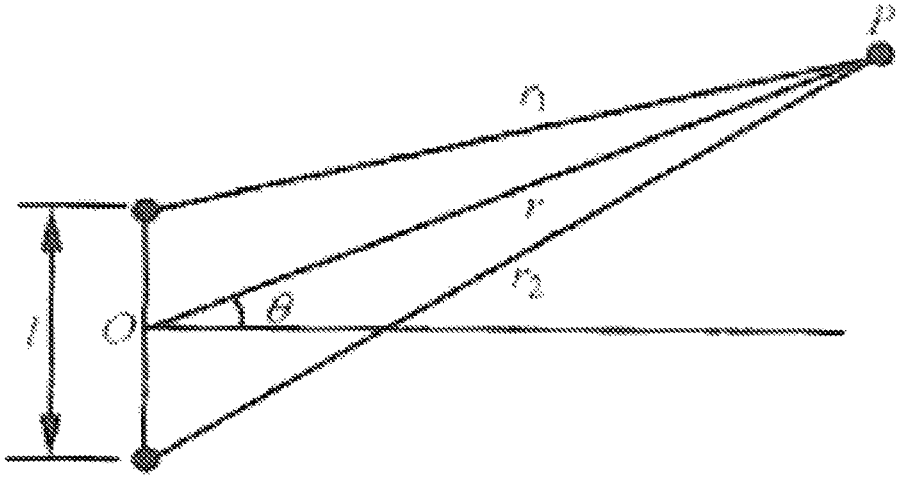
FIG. 6 is a schematic diagram of the principle of the audio device in an external audio playback state provided by an embodiment of the present disclosure.

FIG. 6 is a schematic diagram of the principle of the audio device in an external audio playback state provided by an embodiment of the present disclosure. As shown in FIG. 6, assuming that a distance between the two sound sources (i.e. the sound holes) is 1, the receiving point of the listener is P, distances from the two sound sources to the receiving point P are respectively $r_1$ and $r_2$, and an angle between a line connecting the midpoint and the receiving point P and a horizontal plane is θ. Two cases of external sound effects of the audio device of the present disclosure will be described below in conjunction with FIG. 6.

(1) Near-Field Enhancement

When the second front sound hole 3 is opened and the rear sound hole 4 is closed, the first front sound hole 2 and the second front sound hole 3 are in communication with the first sound generation unit 7 and the second sound generation unit 8, respectively. When the two sound generation units input the same signal, since the two front sound holes are very close to each other, they can be regarded as two monopoles having the same radiation phase, and the combined sound source is equivalent to an omnidirectional and amplitude doubled sound source, realizing an effect of near-field enhancement. The physical laws are explained as follows.

Sound pressure p at point P is:

$$p = \frac{A}{r_1} * e^{j(\omega t - kr_1)} + \frac{A}{r_2} * e^{j(\omega t - kr_2)},$$

wherein $$k = \frac{\omega}{c},$$

ω is an angular velocity, k is the wave number, and A is a constant, which is related to air density and speed of sound in the air.

Combined sound source directivity D is:

$$D(\theta) = \frac{(p_a)_\theta}{(p_a)_{\theta=0}},$$

wherein (Pa) is the sound pressure amplitude, and Pa=|A|/r.

$$\text{If: } \Delta = \frac{1}{2}\sin\theta, \text{ then } D(\theta) = \left|\frac{\sin 2k\Delta}{2\sin k\Delta}\right|,$$

wherein Δ is half of the sound path difference between each of the two sound sources and the receiving point.

When the two sound holes are very close to each other, it can be regarded as:

$$kl \ll 1, \text{ then } \Delta k \ll 1, \text{ and then } D(\theta) = 1, \text{ and } p = \frac{2A}{r} * e^{j(\omega t - kr)}.$$

That is, the sound pressure is twice that of a single sound source and has no directivity.

(2) Far-Field Directivity

When the rear sound hole 4 is opened and the second front sound hole 3 is closed, the first front sound hole 2 is in communication with the front cavity of the first sound generation unit 7, and the rear sound hole 4 is in communication with the rear cavity of the second sound generation unit 8. When the two sound generation units input the same signal, the two sound holes generate signals having different phases, and since a distance between the two sound holes is relatively far, they can be regarded as dipoles having the same radiation amplitude but opposite phases, and the combined sound source has ∞-shaped directivity in the far field, realizing an effect of far-field directivity. The physical laws are as follows:

$$p = \frac{A}{r_1} * e^{j(\omega t - kr_1)} - \frac{A}{r_2} * e^{j(\omega t - kr_2)}, \text{ and } k = \frac{\omega}{c}.$$

When l<<r, and for low frequency, it can be regarded as kl<1, and then $$p \approx -j\frac{kAl}{r} * \cos\theta * e^{j(\omega t - kr)},\ D(\theta) = \cos\theta.$$

It can be seen that it is in a shape of cc in polar coordinates, i.e., it has excellent directivity. Therefore, the desired directional sound production can be realized by properly adjusting the setting angle of the two sound holes.

The present disclosure also discloses an intelligent wearable device, wherein the intelligent wearable device includes any audio device as described above. The intelligent wearable device may be a smart watch, a smart bracelet, an AR device, a VR device, a neck-mounted speaker, and the like.

In summary, the audio device and the intelligent wearable device including the same of the present disclosure can realize the switching of different external sound effects by controlling the combination of the sound cavities of the two sound generation units, thereby meeting the growing demands of users.

The above are only specific implementations of the present disclosure, and those skilled in the art can make other improvements or modifications on the basis of the above embodiments under the above teaching of the present disclosure. Those skilled in the art should understand that the above specific description is only to better explain the purpose of the present disclosure, and the protection scope of the disclosure should be based on the protection scope of the claims.

What is claimed is:

1. An audio device, comprising:

a housing in which a first sound generation unit and a second sound generation unit are disposed, each of the first sound generation unit and the second sound generation unit has a front cavity and a rear cavity separated from each other, and the housing is provided with a first front sound hole in communication with the front cavity of the first sound generation unit, a second front sound hole in communication with the front cavity of the second sound generation unit, and a rear sound hole in communication with the rear cavity of the second sound generation unit; and a sliding baffle, wherein the sliding baffle is slidable between a first position and a second position with respect to the housing, and the sliding baffle is provided with a first through hole and a second through hole, wherein when the sliding baffle is located at the first position, the first through hole is in communication with the second front sound hole so that the second front sound hole is opened, and the second through hole is misaligned with the rear sound hole so that the rear sound hole is closed, and wherein when the sliding baffle is located at the second position, the first through hole is misaligned with the second front sound hole so that the second front sound hole is closed, and the second through hole is in communication with the rear sound hole so that the rear sound hole is opened.

2. The audio device of claim 1, wherein the first sound generation unit and the second sound generation unit output signals having the same phase, and a distance between the first front sound hole and the second front sound hole is less than a distance between the first front sound hole and the rear sound hole.

3. The audio device of claim 1, wherein a partition plate is provided inside the housing, and the partition plate divides an inner cavity of the housing into two separated tube-shaped cavities to serve as the front cavities of the first sound generation unit and the second sound generation unit, respectively.

4. The audio device of claim 3, wherein the first sound generation unit and the second sound generation unit are respectively located at left and right sides of the partition plate, and the two tube-shaped cavities divided by the partition plate are arranged in an up and down direction in the housing.

5. The audio device of claim 1, wherein the audio device further comprises a driving unit, and the driving unit is configured to drive the sliding baffle to slide according to a control signal, so as to switch opening and closing states of the second front sound hole and the rear sound hole.

6. The audio device of claim 5, wherein the driving unit comprises a driving motor and a gear, and wherein the gear is engaged with the driving motor, a lever is provided on the gear, a sliding slot is provided on the sliding baffle, and the lever of the gear inserts into the sliding slot of the sliding baffle to drive the sliding baffle to slide by rotation of the driving motor.

7. The audio device of claim 5, wherein the audio device further comprises a control unit configured to receive a switching instruction, and send a control signal to the driving unit according to the switching instruction.

8. The audio device of claim 7, wherein the control unit comprises a microphone disposed in the housing, and the microphone receives the switching instruction through a microphone hole provided on the housing.

9. The audio device of claim 8, wherein the switching instruction is a predetermined tapping signal, and wherein the control unit further comprises a signal processing circuit for processing signals received by the microphone, and generating a corresponding control signal if the predetermined tapping signal is detected.

10. An intelligent wearable device, wherein the intelligent wearable device comprises the audio device of claim 1.

* * * * *